July 25, 1950  S. S. GREEN  2,516,114
ALTERNATOR
Filed Dec. 30, 1946  2 Sheets-Sheet 1
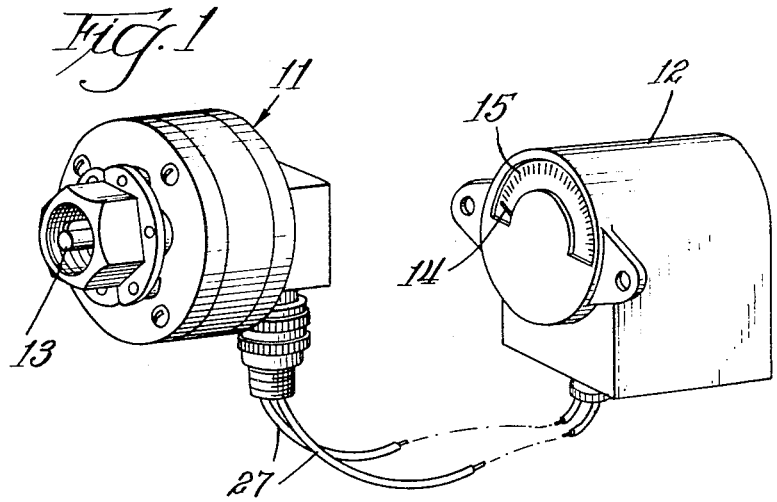
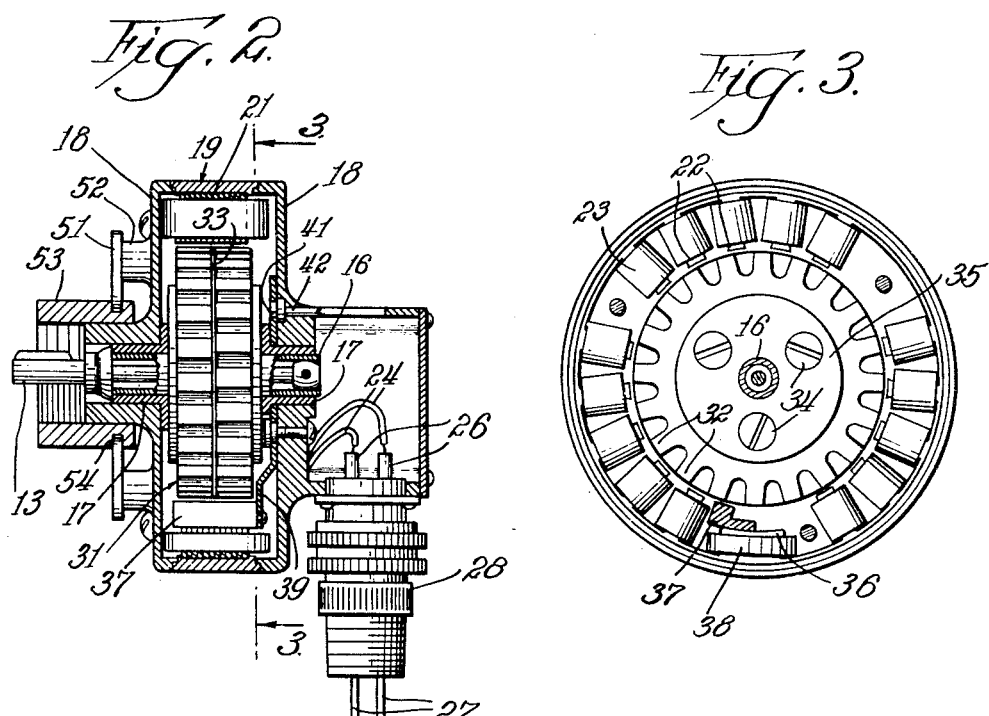
INVENTOR.
Stanley S. Green
BY
Louis Robertson Atty.

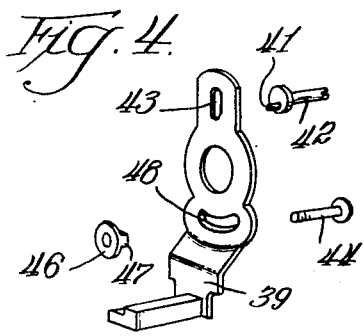
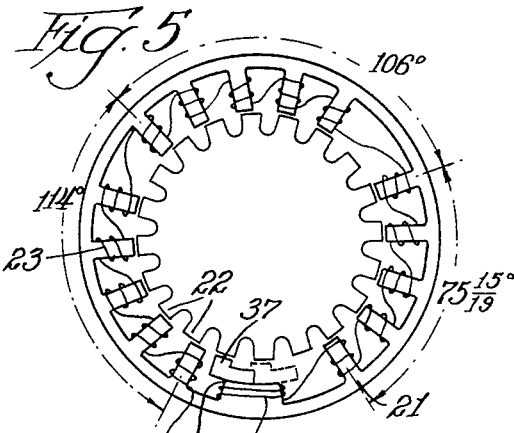
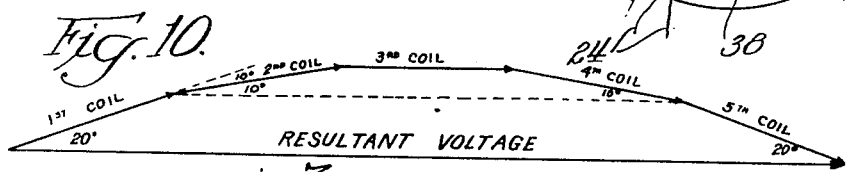
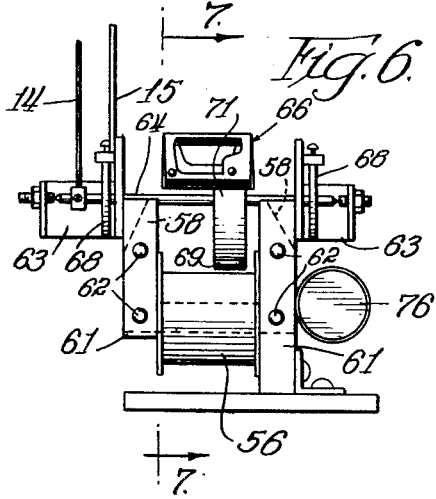
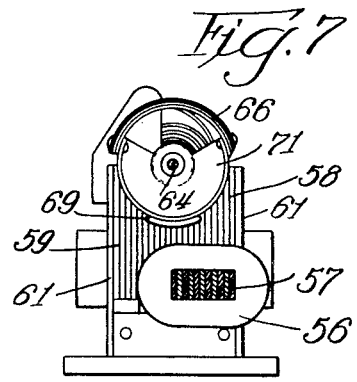
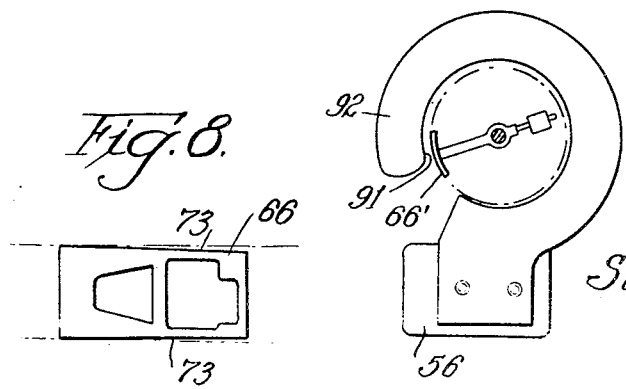

Patented July 25, 1950

2,516,114

UNITED STATES PATENT OFFICE 2,516,114

ALTERNATOR

Stanley S. Green, New Bedford, Mass., assignor to Duncan Electric Manufacturing Company, La Fayette, Ind., a corporation of Illinois Application December 30, 1946, Serial No. 719,311

4 Claims. (Cl. 171—252)

There are many instances in which it is desirable to know the speed of rotation of a piece of machinery. One of the most important is in aircraft wherein it is commonly desired to operate the engines at a predetermined number of revolutions per minute. Considerable effort has been devoted to the development of improved speed indicators or tachometers for aircraft engines. In common with many other tachometer uses, aircraft tachometers must usually have the indicator at a point remote from the engine. Dependability, accuracy, and ease of reading are even more important in aircraft than in most other installations. A very important consideration in aircraft is that the equipment be light in weight.

According to the present invention, a very light-weight, highly-dependable and accurate, and easily-read tachometer is provided which may be manufactured at reasonable cost. It is suitable for aircraft as well as for other purposes.

The invention combines a simple, alternating current, single phase generator of novel characteristics with an indicator especially suited to this generator and also having novel characteristics, the two units together constituting a very light-weight, dependable, accurate tachometer. Because single phase current is used, only a single pair of conductors need extend from the generator to the indicator, and, of course, one of these may be "ground," i. e., the frame or body of the aircraft.

Tachometers of this general type have been proposed before but have not proved to be entirely satisfactory. According to the present invention, an unusually high A. C. frequency is used, minimizing low-speed effects such as visible pulsing of the indicator hand, eliminating objectionable vibration, and permitting a reduction in the weight of the parts.

An unusual feature of the generator is that its stator has a slightly different pole spacing from its rotor so that the voltage peaks in the coils carried by the different poles do not coincide. Before this invention, this would have seemed a very undesirable feature since it results in some loss of total peak voltage from the generator. This loss is more than offset, however, by improved performance characteristics in other regards. The generator is extremely smoothly and easily driven because the off-phase distribution of the poles results in a spreading or smoothing out of the magnetic attraction tending to draw the rotor to certain angular positions, especially when turned at low speed. Also, the off-peak distribution of the poles has been found to produce an output, the wave of which is exceptionally close to a true sine wave, thus contributing to the efficiency and accuracy of the tachometer.

The preferred indicating instrument is one which is simple but accurately responsive to alternating current so as to require no rectification of the current with the consequent likelihood of introducing errors and causing failures. For ease of reading, it is preferably constructed to have an exceptionally-wide angle of movement. The preferred form lends itself easily to increasing the movement along part of the scale to expand that part of the scale if preferred.

The generator of this invention, modified by substituting windings which produce a three-phase output, may be used with a motor and speed-ring type of indicator with some advantages. The single or polyphase generator may be used for other purposes even though it is especially advantageous for tachometers.

Additional objects and advantages of the invention will be apparent from the following description and from the drawings in which:

Figure 1 is a perspective and partly diagrammatic representation of the form of the invention chosen for illustration;

Fig. 2 is a vertical sectional view taken through the form of generator illustrated in Fig. 1;

Fig. 3 is a transverse vertical sectional view taken approximately on the line 3—3 of Fig. 2;

Fig. 4 is an exploded view of the voltage-adjustment feature of the form of the invention of Figs. 1 to 3;

Fig. 5 is a view of a lamination used in the stator used in Figs. 1 to 3, the single-phase winding being shown thereon diagrammatically, and the rotor also being indicated;

Fig. 6 is a somewhat diagrammatic view of the preferred form of indicating instrument forming a part of this invention;

Fig. 7 is a vertical sectional view of the structure of Fig. 6 taken approximately on the line 7—7 of Fig. 6;

Fig. 8 is a developed view of the face of one of the laminations of the rotor in Figs. 6 and 7; and Fig. 9 is a view illustrating a modified form of the invention.

Fig. 10 is a voltage-vector diagram of fine generator coils series connected.

Although the law requires a full and exact description of at least one form of the invention, such as that which follows, it is, of course, the purpose of a patent to cover each new inventive concept therein no matter how it may later be disguised by variations in form or additions of further improvements, and the appended claims are intended to accomplish this purpose by particularly pointing out the parts, improvements, or combinations in which the inventive concepts are found.

In the illustrated form of the invention, the tachometer includes a generator 11 and an indicator 12 electrically connected to the generator 11. The generator includes a coupling shaft 13 by which the generator is driven with a speed equal or proportional to the speed of an aircraft engine or other device whose speed is to be measured. The speed is indicated by a pointer 14 moving along a scale 15 in proportion to the speed being measured.

The generator

The generator of Figs. 1 to 5 is an exceptionally efficient and satisfactory generator, especially for the particular purpose. The coupling shaft 13 is preferably loosely but drivingly associated with rotor shaft 16 which rotates smoothly in bearings 17 carried by end bells 18 which, together with cylinder 19, form the main portion of the generator housing. The cylinder 19 together with the parts carried by it forms the stator of the generator, although the cylinder 19 itself is preferably a mere supporting shell of non-magnetic material, such as aluminum or stainless steel. Stator laminations 21 may be securely held in this shell with a press fit. The shape of these laminations is best seen in Fig. 5. As seen in Fig. 3, the teeth 22 of these laminations have pre-wound coils 23 thereon. The connection for these coils for single-phase operation is shown diagrammatically in Fig. 5. The two lead wires 24 seen in Fig. 5 may be connected to the terminal ends of connecting prongs 26. The wires 27 or cable leading to the indicator 12 may be connected to the connecting prongs 26 by suitable plug 28.

The rotor shaft 16 carries fast thereon one or more permanent magnets 31 forming the rotor of the generator. In the illustrated embodiment, each of these permanent magnet discs has twenty teeth or poles 32, as seen in Figs. 3 and 5. These rotors are preferably cast from Alnico with the teeth formed therein, after which they are machined to the necessary accuracy. It may be noted that at present the gate for the molding step bridges across two teeth so that one of the gaps between the teeth is cut by machine. Each Alnico disc is magnetized with adjacent poles of opposite polarity and is given suitable knockdown and stabilizing treatment to ensure permanent accuracy of the finished tachometer. The two Alnico discs are assembled with like poles adjacent one another, a non-magnetic spacer 33 of relatively soft metal at present being preferred. The assembly may be clamped together by screws 34 and clamp plates 35.

Off-peak coils

It will be observed that the teeth 22 of the stator do not have the same angular spacing as do the poles 32 of the rotor. Thus the poles are centered approximately every 18 degrees. In the particular example illustrated, the teeth 22 are, however, arranged in groups with five teeth in each group spanning a total of $75^{15}/_{19}$ degrees measured at the tooth centers. Thus the spacing of the centers of the teeth 22 on the stator is slightly in excess of the 18 degree intervals at which the poles of the rotor are positioned. This produces considerable chording or out-of-phase addition of the voltages generated in the individual coils on each separate tooth. In other words, considering one group of stator teeth 22, the voltages generated in the coils 23 thereon will be slightly out of phase with one another and the actual total voltage less in value than this arithmetical sum.

Heretofore, any chording has been regarded as somewhat undesirable since it results in some lowering of the peak voltage. In the present instance, however, it has been found to be very desirable, particularly because of the fact that it results in an output voltage for the generator which is exceptionally close to the idea of an accurate sine wave. This in turn leads to greater efficiency and accuracy in the tachometer. Another advantage in having the spacing of the stator teeth slightly different from that of the rotor poles is that it reduces the tendency of the magnetic attraction to pull the rotor to certain angular positions. This permits smoother rotation of the rotor especially when turned slowly since less force is required to turn the rotor away from the positions which it tends to assume. In other words, the torque required to turn the rotor is more nearly constant.

It is preferred that the phase displacement of individual coils from the phase of the combined circuit be not over 30 degrees because the phase displacement in individual coils would then detract substantially from the main voltage. In the illustrated example, three groups of teeth are connected in series to provide the total single phase voltage. Coilless stator teeth corresponding to the omitted coils between groups could be provided, however, to make the torque more uniform. For aircraft, it is preferred that they be omitted, as shown.

From the foregoing it is seen that an important feature of the invention is the spacing of the stator teeth so that the voltages in at least one and preferably most of the respective coils are slightly out of phase with both the negative and positive peaks of the output voltage wave in the circuit which includes all the coils mounted on these teeth.

Another important and novel feature is that one coil of any desired number of turns is individual to each stator tooth, and each stator tooth is subjected to substantially all of the flux from each rotor pole as it passes that tooth. No coil spans a plurality of teeth as has been common in past practice. This procures the important advantage that the end-turn portions of coils from different teeth (the parts passing beside the teeth, outside of the notches) do not have to cross each other. This makes for a simple and compact winding on the stator which is applied with a minimum of labor and a minimum of insulation difficulties.

An important feature, also, is the breaking up of the coils on the stator teeth into groups and the connection of these groups combined with the electrical angular spacing of such groups so that their voltage adds up without too much out-of-phase loss, even though the spacing of the teeth in each group is equivalent to having a continuous series of teeth where the number of rotor poles differs slightly from the number of stator teeth, the two numbers being sufficiently close together so that each stator tooth gets substantially all of the flux of each rotor pole as that pole passes it during rotation.

A discussion of the specific example of pole and tooth arrangements shown in Fig. 5 is herewith given for the purpose of illustrating the general principles involved. In this figure, the rotor has twenty poles, approximately uniformly spaced around its periphery of 360 space degrees. This is ten pairs of alternately spaced north and south poles. As each pole pair passes a stator tooth, a complete cycle of voltage having a positive and negative maximum is generated in the coil on that tooth. Because of the uniform gap between pole and tooth, this voltage wave is relatively flat-topped or trapezoidal in shape in the individual coil and considerably removed from pure sine shape.

The complete electrical voltage cycle of 360 electrical degrees in a given coil occurs while a pair of poles is passing it and, hence, during each tenth of a revolution since there are ten pairs of poles. In other words, an electrical cycle occurs in 360/10 space degrees or one space degree of rotor rotation produces ten electrical degrees in its effect.

The rotor teeth are centered 360/20 or 18 space degrees apart. The stator teeth, however, are in three groups and the teeth in each group are 360/19 or $18\frac{18}{19}$ space degrees apart. This is a difference of $\frac{18}{19}$ space degrees or $9\frac{9}{19}$ electrical degrees. This would have the effect of causing the generated voltage wave in each succeeding tooth in any group of teeth to lag behind the voltage wave of its preceding tooth by $9\frac{9}{19}$ electrical degrees. For convenience in this discussion, the above value will be called ten electrical degrees.

Fig. 10 shows the vector diagram of a group of five coils having voltages of equal magnitudes but connected in series; with each voltage lagging or out of phase with the one preceding it, by ten degrees. The total voltage resembles the chord of a circle with the five individual vectors approximating the circumference. As can be seen from the diagram, surprisingly little voltage magnitude is lost as a result of this chording of voltages as long as only five coils are used, spaced as shown. If this series extended all of the way around the stator with 19 coils, one half of them connected in series with like polarity would produce a vector diagram resembling a semi-circle, the cord representing the resultant voltage being the diameter of the circle. The ratio of the resultant voltage magnitude to the arithmetical sum of the separate voltages would then approximate $2/\pi$ which indicates a loss too great for efficiency and economy. It is therefore, preferred to chord to an extent such that the electrical angle between the resultant voltage and the individual coils having the greatest angular displacement from the resultant voltage do not exceed from 20 to 60 electrical degrees; these coils normally being at the ends of the series.

It should be noted that the chording here is between individual coils and not between opposite sides of the same coil. In past practice, it has been common for one stator coil to span several stator teeth. It has been common for the number of teeth spanned to be less than the full number of teeth included in a pole pitch (the number of space degrees spanned by rotor poles). It is obvious and familiar to those skilled in the art that this has caused chording within its individual stator coil itself because of the phase difference in the voltage generated in its two sides.

According to the present invention, all of the advantages which have been obtained heretofore by chording with the complicated coil arrangements of the past are obtained with a very simple arrangement on which there is one individual coil to each stator tooth, this arrangement being one which is very compact, very easily applied, and very efficient.

It is obvious that the positions of the three groups of coils shown in Fig. 5 can be chosen so that the three resultant voltages from them will add up in a straight line (that is, be in phase when they are connected in series). Alternatively, if a three phase generator were wanted, they could be connected in star or delta and arranged with the positions of the groups on the stator, such that the group voltages would be 120 electrical degrees apart.

It should be observed that, even if wider variations are made in the relative positions of the poles and teeth than are shown in Fig. 5, no coil need have an electrical phase displacement even as much as 90 electrical degrees from the circuit in which it is connected. If the position of a given tooth with respect to the nearest pole in Fig. 5 would seem to make it more than 90 degrees out of phase with its circuit, it would be connected or wound in the opposite direction so that it will be less than 90 degrees out of phase with the reverse phase of its circuit.

As a matter of fact, those teeth which would be close to 90 electrical degrees, or even as much as 60 electrical degrees, out of phase with the circuit should be either omitted or left without coils. In the preferred form, the coil voltages are all within approximately 30 electrical degrees of the output of the circuit in which they are connected.

Inasmuch as this out of phase or off-peak spacing of the stator poles is desirable, it is not essential that the rotor have its poles positioned with exact uniformity, nor is it necessary that the poles on one rotor disc be exactly aligned with those on another. In Fig. 2, for example, it is seen that there is some misalignment of some of the poles. A generator having such misalignment between a few of its pairs of poles has nevertheless been found quite satisfactory. In fact, it would be within the scope of the present invention to judiciously vary the spacing of the poles on the rotor in a way to produce off-peak positioning of the stator teeth even if the spacing of the stator teeth were the same as the average spacing of the teeth of the rotor poles.

*Voltage adjustment*

It is not commercially practical to produce the Alnico rotors and to provide them with the proper knock-down and stabilization and still have them identical to one another magnetically.

Because of some magnetic variations and because of other unavoidable manufacturing variations, it is highly desirable to be able to adjust the voltage output of the generator. This permits production of all the generators to produce a predetermined output at any given speed so that they may be connected interchangeably with the different indicators. According to the present invention, this voltage adjustment is accomplished by an adjustment of the magnetic circuit of the stator.

The preferred form of this magnetic voltage adjustment is seen in Figs. 2 to 5. Each of the stator laminations is provided with a wide tooth 36, thus forming a wide tooth on the stator. A shifting tooth 37 cooperates with the wide tooth or tooth base 36. This is preferably shiftable a distance equal to the spacing of the tooth centers of the rotor or 18 degrees in the illustrated form. This movement is enough to completely reverse the instantaneous voltage in a coil 38 surrounding the tooth base 36. The coil 38 need have only a few windings compared to the number of windings in the coils 23. Preferably, one extreme position of the sliding tooth 37 will exactly synchronize the voltage induced in coil 38 with the peaks of the output voltages from the generator while its other extreme position will exactly coincide with the peak voltages of opposite polarity, so that in one instance it adds to the generator voltage while in the other it subtracts from the generator voltage.

For ease of adjustment, the shifting tooth 37 is preferably carried by a bracket 39 which is journalled on the inside of the main generator housing, being moved through a small angle by means of a crank pin 41 eccentrically mounted on a crank shaft 42 which is notched at its outer end to receive a screw driver. The pin 41 engages a radial slot 43 in bracket 39. The bracket 39 is clamped in any adjusted position by a screw 44 and a clamp nut 46. The clamp nut 46 is provided with a key 47 which rides in slot 48 in bracket 39 to prevent the clamp nut 46 from turning.

Another form of voltage adjustment which could be provided would be to leave a gap in the stator ring 21 between two of the stator teeth 22 and provide a sliding magnetic plug in this gap.

Mounting of generator

The generator may be mounted to the aircraft engine or other device whose speed is being registered in any suitable manner. In the illustrated form of the invention, a mounting plate 51 is spot welded to lugs 52 on one of the end bells 18, and an internally-threaded coupler 53 is provided with an annular groove 54 to receive the mounting plate 51. By screwing the coupler onto a suitable threaded receiving coupler on the engine housing, the generator is drawn tight thereon, the coupling shaft 13 fitting into a mating shaft in the engine.

Indicator

Various types of indicators can be used for measuring the voltage, amperage or frequency of the generator output, or any combination of these, the instrument, of course, being calibrated in revolutions per minute or speed rather than the electrical quantities. For the sake of simplification and dependability, an output meter is preferred having a stationary coil on an iron core with opposed pole pieces and with an iron armature or vane output. Although the preferred types of meters probably have the characteristics of voltage meters more than any other common type, the term, output meter, is preferred.

Wide deflection

Conventional magnetic vane (armature) meters have only a small angular range of deflection, the vane armature usually being mounted between two poles and pivoted from a position perpendicular to the poles to a position in alignment therewith, a maximum of 90 degrees. According to the preferred form of the invention, however, a construction is used which will yield a deflection considerably over 90 degrees, the illustrated form being approximately 180 degrees.

The preferred type of indicator is shown in Figs. 6 to 8. The indicator coil 56 is mounted on a laminated core 57. In the drawings, the core laminations are shown of U shape, the legs 58 forming pole portions being widened by additional laminations 59. All of the laminations are clamped together by clamping bars 61 preferably angular in cross-section for rigidity. While the stack is held clamped in a press, rivets 62 extending through the stack are applied.

For simplification of manufacture, the core 57 may be formed of flat straight laminations clamped between pole pieces lying in planes perpendicular to the axis of the rotor. The clamp plate 61 or pole pieces may be used for supporting the vane and indicator assembly. Thus bearing brackets 63 may be carried by the angular arms 61 and a shaft 64 may be suitably pivoted by the bearing member 63. In the illustrated form, only simple pivot bearings have been shown, but in practice, only high quality bearings would be used, such as ring and end bearings of synthetic sapphire or any of the bearings disclosed in my co-pending application, Serial No. 448,493, now Patent No. 2,359,282.

The shaft 64 carries a vane 66 of a magnetic material which is normally held approximately in the position seen in Figs. 6 and 7 by hair springs 68. The vane is preferably accurately balanced with a counterweight 69 which is preferably non-magnetic. Both the vane and the counterweight may be supported from the shaft by a non-magnetic cup 71, which, being cut out adjacent the vane, may also serve as a part of the counterweight.

As seen in Fig. 8, one end of the vane 66 is slightly narrower than the other end. Current from the generator 11 flowing through coil 56 will draw the wider end of the vane down between the poles 58. As the generator is driven faster and faster, more and more current will flow through the coil 56 and the vane 66 will be drawn further and further in between the poles 58 until it approximately reaches a position forming a path of minimum reluctance for magnetism generated by coil 56. The angular movement of the vane and the shaft 64 is approximately 180 degrees. Thus the shaft may be provided with a pointer 14 which operates adjacent a scale 15 which extends through approximately 180 degrees.

By shaping the diverging edges 73 of the vane 66, its movement may be correlated to any desire scale arrangement and, at the same time, compensation may be provided for any constant characteristics which might otherwise produce inaccuracies. For example, the diverging edges 73 may be shaped to read accurately adjacent a linear scale in which the calibrations are spaced uniformly from end to end on the scale or the edges may be shaped to condense the scale at one end or the other or to expand any part of the scale for easier reading on that part.

Instead of using a diverging vane, a vane of constant width could be used and the poles shaped to converge toward the path of the vane. By making the vane quite narrow in a circumferential direction so that its idle position does not take up much angular space about the shaft 64, the converging poles may be extended through considerably more than 180 degrees. In this way the indicator may be made to rotate through at least 330 degrees, even though fixed directly on the shaft of the vane. Of course, by interposing gearing between the vane shaft and the pointer, the pointer may be made to rotate through any desired angle with the 180-degree output meter construction of Figs. 6 to 8. This is diagrammatically indicated in Fig. 9 in which the rotor is disposed opposite to pole faces 91 which face the axis and converge toward the axis, the pole faces being the poles 92, one of which is spaced behind the one seen clearly in Fig. 9. However, the converging could be parallel to the axis, with the vane disposed directly between the faces, the disposition being similar to that of Figs. 6 and 7.

*Compensation*

The generator and indicator should each be substantially immune to temperature changes inasmuch as they are often subjected to different temperatures, the indicator being within the cabin of the plane and the generator being subjected to greater influence from either the outside temperatures or engine temperatures. The illustrated form of generator, if provided with a .010 inch gap between the rotor and the stator, is reasonably free from variations due to temperature even without compensation. Any suitable type of compensation may be added, however, that preferred being the application of magnetic compensation to the rotor 31. This compensation may take the form of the application of a plate thereto, the plate being formed of a metal having a negative temperature coefficient of permeability, such as nickel steel. It is also preferred to compensate for temperature changes in the resistance of the wire forming the coils 23 by placing in series with the windings a resistor having a negative temperature coefficient of resistance. One of these which has been found suitable is that manufactured by the Keystone Carbon Company. This has been found satisfactory when used in parallel with a shunt of zero temperature coefficient material. These resistors are preferably placed in the end bells 18 of the generator so as to minimize temperature errors due to self-heating during the first few minutes of operation.

The indicator is also exceptionally free from temperature error even without the compensation, if two hair springs wound in opposite directions are used. Beryllium copper springs are at present preferred and for extreme accuracy some compensation is desired. Either the nickel steel, magnetic shunts, or the negative temperature coefficient resistor may be used.

A condenser 76 may be connected across the coil 56 of the indicator, its chief purpose being to reduce the volt-ampere load of the indicator upon the generator at higher speeds, or, in other words, to provide greater volt-ampere output from a given generator.

Of course, it affects the calibration of the instrument, but this, at the most, affects the shaping of the diverging vane edges 73 and the temperature compensation.

Any suitable zeroizing and torque adjustment may be provided for the indicator.

Although the teeth may have a wide variety of spacings, that described and indicated in Fig. 5 has been found to give excellent results, and is at present preferred. The diameter of the stator ring chosen for illustration, and found satisfactory, is 2³¹⁄₃₂ inches.

The generator may easily be wound to provide 100 v. output. This permits the use of a small neon lamp such as the G. E. type T2 bulb for synchronizing two engines, the lamp being connected across the additive voltage of the two separate generators, each driven by one engine.

Lack of synchronism will be indicated by a beat effect.

For some purposes, it may be preferred to change the windings of the generator to provide three-phase output. For this purpose the windings on each of the slightly separated groups of poles or teeth in Fig. 5 may be used for one of the phases with slight repositioning of the groups relative to one another. The three-phase output could be used, for example, for driving an indicator of the magnetic drag type comprising a three-phase motor and a magnet which drives a speed cup, the deflection of the indicator being proportional to the magnetic drag by the permanent magnets and the currents induced thereby in the speed cup. This form of tachometer would lack some advantages of the present invention but would retain others. For example, it would require one more wire in the circuit and a heavier and more complex indicating instrument. It would, however, take advantage of the more efficient generator with its greater output per pound of weight, its higher frequency, and its more accurate approach to the true sine waves. Although the sine waves might not be quite as accurate in each phase with only five stator teeth per phase as with the present single-phase with fifteen stator teeth in the one phase, the sine wave would, nevertheless, be quite accurate inasmuch as the five teeth of one phase are spaced slightly differently from the rotor poles so that not more than one of them would have its voltage peaks in synchronism with the main output voltage peaks.

The voltage adjustment would not be necessary in this type of tachometer and hence the wide tooth 36 and the sliding tooth 37 could be omitted.

It should also be mentioned that ordinary 3½ per cent silicon 29 ga. cold rolled lamination steel has been found satisfactory for both the generator and the indicator.

From the foregoing it is seen that a tachometer is provided of exceptional efficiency and simplicity and of high accuracy.

I claim:

1. An alternating current generator having a stator and a rotor capable of being revolved at a given speed with respect to the stator, an air gap between rotor and stator, said rotor having an even number of magnetic poles alternating in polarity and separated from each other along the air gap periphery by a substantially uniform pole pitch and delivering magnetic flux from one adjacent pole to the other across the air gap and through the stator, said stator being composed of magnetic sheets having a plurality of teeth, the majority of said teeth being sufficient in peripheral width along the air gap to receive substantially the entire flux output of a rotor pole as said pole rotates past them, a plurality of coils each individual to one fixed stator tooth and encompassing only one tooth whereby an alternating voltage is induced in each coil as the rotor poles successively pass by, said individual induced coil voltages having a fundamental frequency per second equal to the number of revolutions per second of the given rotational speed multiplied by the number of pairs of rotor poles, a plurality of such coils being connected in series in a group connected between a pair of generator terminals to add their voltages so that the resultant output voltage across said terminals is predominantly of the fundamental frequency, the polarity of the connections of each coil in said group causing the voltage of said coil to increase the peak voltage of the resultant output voltage of the group, and the individual stator teeth being spaced on the air gap periphery with their centers at a distance slightly different from the rotor pole pitch so as to give a chording effect in such added coil voltages.

2. An alternating current generator having a stator and a rotor capable of being revolved at a given speed with respect to the stator, an air gap between rotor and stator, said rotor having an even number of magnetic poles alternating in polarity and separated from each other along the air gap periphery by a substantially uniform pole pitch and delivering magnetic flux from one adjacent pole to the other across the air gap and through the stator, said stator being composed of magnetic sheets having a plurality of teeth, the majority of said teeth being sufficient in peripheral width along the air gap to receive substantially the entire flux output of a rotor pole as said pole rotates past them, a plurality of coils each individual to one fixed stator tooth and encompassing only one tooth whereby an alternating voltage is induced in each coil as the rotor poles successively pass by, said individual induced coil voltages having a fundamental frequency per second equal to the number of revolutions per second of the given rotational speed multiplied by the number of pairs of rotor poles, a plurality of such coils being connected in series in a group connected between a pair of generator terminals to add their voltages so that the resultant output voltage across said terminals is predominantly of the fundamental frequency, the polarity of the connections of each coil in said group causing the voltage of said coil to increase the peak voltage of the resultant output voltage of the group, and the individual stator teeth being spaced on the air gap periphery with their centers at a distance slightly different from the rotor pole pitch so as to give a chording effect in such added coil voltages with the coils of the group spaced to provide at least five different phase relationships to the resultant voltage, none displaced as much as 60 electrical degrees therefrom.

3. An alternating current generator having a stator and a rotor capable of being revolved at a given speed with respect to the stator, an air gap between rotor and stator, said rotor having an even number of magnetic poles alternating in polarity and separated from each other along the air gap periphery by a substantially uniform pole pitch and delivering magnetic flux from one adjacent pole to the other across the air gap and through the stator, said stator being composed of magnetic sheets having a plurality of teeth, the majority of said teeth being sufficient in peripheral width along the air gap to receive substantially the entire flux output of a rotor pole as said pole rotates past them, a plurality of coils each individual to one fixed stator tooth and encompassing only one tooth whereby an alternating voltage is induced in each coil as the rotor poles successively pass by, said individual induced coil voltages having a fundamental frequency per second equal to the number of revolutions per second of the given rotational speed multiplied by the number of pairs of rotor poles, a plurality of such coils being connected in series in a group connected between a pair of generator terminals to add their voltages so that the resultant output voltage across said terminals is predominantly of the fundamental frequency, the polarity of the connections of each coil in said group causing the voltage of said coil to increase the peak voltage of the resultant output voltage of the group, and the individual stator teeth being spaced on the air gap periphery with their centers at a distance slightly different from the rotor pole pitch so as to give a chording effect in such added coil voltages with the coils of the group spaced to provide at least five different phase relationships to the resultant voltage, none displaced more than 30 electrical degrees therefrom.

4. An alternating current generator having a stator and a rotor capable of being revolved at a given speed with respect to the stator, an air gap between rotor and stator, said rotor having an even number of magnetic poles alternating in polarity and separated from each other along the air gap periphery by a substantially uniform pole pitch and delivering magnetic flux from one adjacent pole to the other across the air gap and through the stator, said stator being composed of magnetic sheets having a plurality of teeth, the majority of said teeth being sufficient in peripheral width along the air gap to receive substantially the entire flux output of a rotor pole as said pole rotates past them, a plurality of coils each individual to one fixed stator tooth and encompassing only one tooth whereby an alternating voltage is induced in each coil as the rotor poles successively pass by, said individual induced coil voltages having a fundamental frequency per second equal to the number of revolutions per second of the given rotational speed multiplied by the number of pairs of rotor poles, a plurality of such coils being connected in series in a group connected between a pair of generator terminals to add their voltages so that the resultant output voltage across said terminals is predominantly of the fundamental frequency, the polarity of the connections of each coil in said group causing the voltage of said coil to increase the peak voltage of the resultant output voltage of the group, and the individual stator teeth being spaced on the air gap periphery with their centers at a distance slightly different from the rotor pole pitch so as to give a chording effect in such added coil voltages with the coils of the group spaced to provide at least five different phase relationships to the resultant voltage.

STANLEY S. GREEN.

REFERENCES CITED

The following references are of record in the file of this patent:

UNITED STATES PATENTS

| Number | Name | Date |
| --- | --- | --- |
| 1,009,798 | Severy | Nov. 28, 1911 |
| 1,312,992 | Kazenmaier | Aug. 2, 1919 |
| 1,323,240 | Bennett | Dec. 7, 1919 |
| 1,551,136 | Curtis | Aug. 25, 1925 |
| 1,807,702 | Nowosielski | June 2, 1931 |
| 1,842,344 | Eaton | June 19, 1932 |
| 1,898,728 | Huff | Feb. 21, 1933 |
| 1,907,343 | Carpenter | May 2, 1933 |
| 2,312,101 | Killam | Feb. 23, 1943 |

FOREIGN PATENTS

| Number | Country | Date |
| --- | --- | --- |
| 563,871 | France | Oct. 5, 1923 |